US012059895B2

(12) United States Patent
Kakiuchi

(10) Patent No.: US 12,059,895 B2
(45) Date of Patent: Aug. 13, 2024

(54) LIQUID DISCHARGING HEAD

(71) Applicant: Brother Kogyo Kabushiki Kaisha, Nagoya (JP)

(72) Inventor: Toru Kakiuchi, Chita (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 180 days.

(21) Appl. No.: 17/588,773

(22) Filed: Jan. 31, 2022

(65) Prior Publication Data

US 2022/0314616 A1 Oct. 6, 2022

(30) Foreign Application Priority Data

Mar. 30, 2021 (JP) ................................ 2021-058234

(51) Int. Cl.
*B41J 2/045* (2006.01)
*B41J 2/14* (2006.01)

(52) U.S. Cl.
CPC ....... *B41J 2/04588* (2013.01); *B41J 2/04581* (2013.01); *B41J 2/04591* (2013.01); *B41J 2/14233* (2013.01); *B41J 2002/14266* (2013.01)

(58) Field of Classification Search
CPC .................................................. B41J 2/04588
See application file for complete search history.

(56) References Cited

U.S. PATENT DOCUMENTS 9,944,070 B1 4/2018 Howkins et al.
2014/0160193 A1* 6/2014 Iwata .................. B41J 2/04588 347/10
2016/0193830 A1* 7/2016 Nishi .................. B41J 2/04588 347/10

FOREIGN PATENT DOCUMENTS

JP 2002-264333 A 9/2002
JP 2018-130953 A 8/2018

* cited by examiner

*Primary Examiner* — Shelby L Fidler
(74) *Attorney, Agent, or Firm* — Banner & Witcoff, Ltd.

(57) ABSTRACT

A liquid discharging head includes a channel member which has a plurality of individual channels, each of the plurality of individual channels having a pressure chamber communicating with a nozzle, and a piezoelectric actuator which is configured to make the liquid discharge from the nozzle by causing a change in a pressure on a liquid inside the pressure chamber. The piezoelectric actuator has a thin-film piezoelectric element, and when a Helmholtz natural frequency of the pressure chamber is let to be Fr (kHz) and a diameter of the nozzle is let to be D (μm), a relationship $$D<-0.0313\times Fr+25.62 \text{ (provided that, } 100 \text{ kHz} \leq Fr)$$

is satisfied, and a viscosity of the liquid discharged from the nozzle is not higher than 5 mPa·s.

6 Claims, 8 Drawing Sheets

FIG. 7

| No. | NOZZLE DIAMETER (μm) | HELMHOLTZ NATURAL FREQUENCY (kHz) | PINCH-OFF-TIME (μsec) | VOLUME OF INK DROPLET (pl) | LIMIT DRIVING FREQUENCY (kHz) |
|---|---|---|---|---|---|
| 1 | 14 | 269.76 | 8.62 | 0.95 | 147.87 |
| 2 | 14 | 171.11 | 12.43 | 1.67 | 105.18 |
| 3 | 14 | 134.04 | 15.13 | 2.06 | 87.73 |
| 4 | 14 | 115.88 | 17.01 | 2.29 | 78.77 |
| 5 | 14 | 103.41 | 18.64 | 2.47 | 72.42 |
| 6 | 18 | 305.72 | 8.57 | 1.34 | 144.16 |
| 7 | 18 | 190.70 | 12.32 | 2.35 | 103.08 |
| 8 | 18 | 146.61 | 15.08 | 2.90 | 85.66 |
| 9 | 18 | 125.43 | 17.01 | 3.23 | 76.80 |
| 10 | 18 | 111.83 | 18.58 | 3.47 | 70.89 |
| 11 | 22 | 338.81 | 10.18 | 1.52 | 114.92 |
| 12 | 22 | 210.97 | 13.32 | 2.82 | 91.33 |
| 13 | 22 | 159.79 | 15.60 | 3.57 | 80.21 |
| 14 | 22 | 134.80 | 17.18 | 4.03 | 74.24 |
| 15 | 22 | 119.43 | 18.40 | 4.35 | 70.35 |

LIQUID DISCHARGING HEAD

CROSS REFERENCE TO RELATED APPLICATIONS

The present application claims priority from Japanese Patent Application No. 2021-058234, filed on Mar. 30, 2021, the disclosure of which is incorporated herein by reference in its entirety.

BACKGROUND

The present disclosure relates to a liquid discharging head which is configured to discharge liquid from nozzles.

DESCRIPTION OF THE RELATED ART

As an example of a liquid discharging head which discharges a liquid from nozzles, an ink-jet head which discharges an ink from nozzles has been known. For example, the ink-jet head includes a plurality of ink channels (individual channels), and each ink channel has a chamber (pressure chamber) communicating with a nozzle.

Moreover, by a piezoelectric actuator causing a change of pressure on the ink in the pressure chamber, ink droplets are discharged from the nozzle.

In a liquid discharging head, for discharging a liquid in a large amount in a short time, it is necessary to increase a driving frequency while securing sufficiently an amount (volume) of a liquid droplet discharged from the nozzle. Therefore, with a view point of targeting an effect of a pressure resonance generated in a chamber, increasing the driving frequency (discharge frequency) as much as possible has been known.

SUMMARY

Here, for increasing the driving frequency of the liquid discharging head, it is necessary to increase the Helmholtz natural frequency of the pressure chamber. The smaller the pressure chamber, the higher is the Helmholtz natural frequency. In recent years, instead of a piezoelectric actuator in which a bulk piezoelectric element (a piezoelectric element in which a plurality of piezoelectric sheets achieved by burning is stacked) has been adopted, a piezoelectric actuator, in which a piezoelectric thin film element is adopted, has been proposed. The piezoelectric thin film is an extremely small device (so-called MEMS (Micro Electro Mechanical System)) in which thin films such as an electrode film and a piezoelectric film are formed in order on a substrate and a plurality of piezoelectric body elements is integrated. By adopting the piezoelectric thin film element, it is possible to reduce a size of the pressure chamber, to increase the Helmholtz natural frequency from 100 kHz up to close to 250 kHz, and to realize the driving frequency of about 100 kHz.

However, in a case of a high driving frequency of a degree of 100 kHz, according to a design of channels, a subsequent liquid droplet may be discharged before a tail (ligament) of a liquid droplet discharged previously is cut (run out). In this case, a problem in which a main liquid droplet from the droplet discharged subsequently is attached to a liquid droplet discharged previously, and the discharge becomes unstable, arises.

An object of the present disclosure is to provide a liquid discharging head which enables to increase the driving frequency and to discharge liquid droplets stably while securing sufficiently an amount of a liquid droplet to be discharged from nozzles.

According to an aspect of the present disclosure, there is provided a liquid discharging head including:

- a channel member having a plurality of individual channels, each of the individual channels having a nozzle and a pressure chamber communicating with the nozzle; and
- a piezoelectric actuator configured to create a pressure change in liquid in the pressure chamber and to cause the liquid to be discharged from the nozzle,
- wherein the piezoelectric actuator has a thin-film piezoelectric element,
- under a condition that a Helmholtz natural frequency of the pressure chamber is Fr (kHz) and a diameter of the nozzle is D (μm), a relationship $$D<-0.0313\times Fr+25.62 \text{ (provided that, 100 kHz} \leq Fr)$$

is satisfied, and

- a viscosity of the liquid discharged from the nozzle is not higher than 5 mPa s.

Inventors of the present application discovered that a pinch-off time, which is a time at which a tail of the liquid droplet discharged from the nozzle is cut (run out), depends on the diameter of the nozzle and the Helmholtz natural frequency of the pressure chamber. Moreover, the inventors of the present disclosure, by numerical calculation (computation), obtained a relationship of a limit driving frequency taking into consideration the pinch-off time, a volume of ink droplets, the nozzle diameter, and the Helmholtz natural frequency. According to the liquid discharging head of the present application, the Helmholtz natural frequency Fr (kHz) and the diameter of the nozzle D (μm) satisfy the relationship $D<-0.0313\times Fr+25.62$ (provided that, 100 kHz≤Fr). Therefore, the liquid discharging head of the present application enables to increase the driving frequency, and to discharge a liquid droplet stably without having an effect of the tail of a liquid droplet discharged previously, while securing adequately the volume of liquid droplets discharged from the nozzle.

BRIEF DESCRIPTION OF THE DRAWINGS

FIG. 7 is a chart depicting a calculation result of a relationship of the nozzle diameter, the Helmholtz natural frequency, the pinch-off time, a volume of the ink droplet, and a limit driving frequency.

DETAILED DESCRIPTION

An embodiment of the present disclosure will be described below while referring to FIG. 1.

(Schematic Configuration of Printer)

Figure 1:
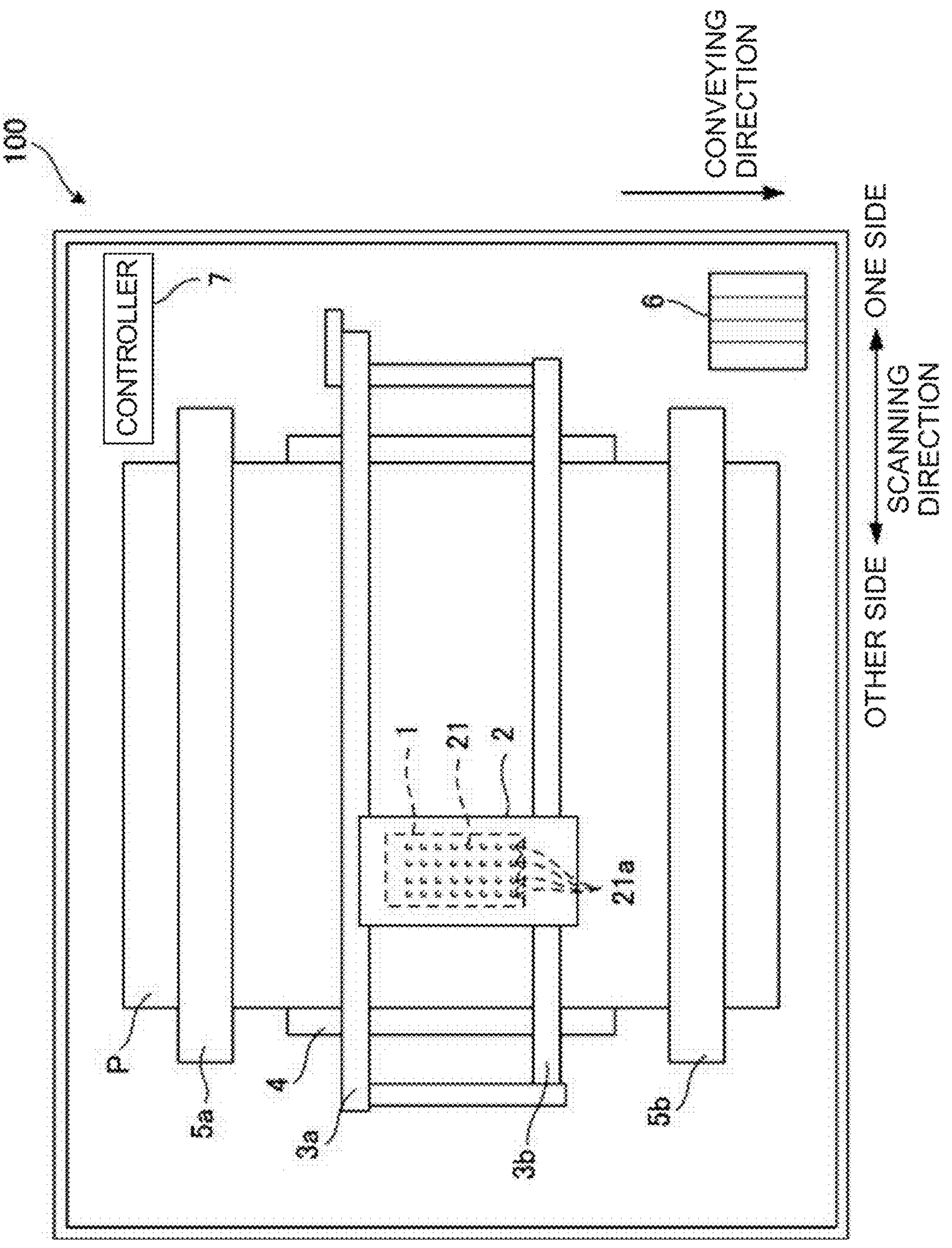
FIG. 1 is a plan view of a printer which includes an ink-jet head according to an embodiment of the present disclosure.

As depicted in FIG. 1, a printer 100 according to the present embodiment includes an ink-jet head 1 ("liquid discharging head" of the present disclosure), a carriage 2, guide rails 3*a* and 3*b*, a platen 4, transporting rollers 5*a* and 5*b*, an ink tank 6, and a controller 7.

The carriage 2 is supported by the two guide rails 3*a* and 3*b* extended in a scanning direction (leftward-rightward direction in FIG. 1) along a horizontal direction, and moves in the scanning direction along the guide rails 3*a* and 3*b*. The ink-jet head 1 is mounted on the carriage 2 and moves in the scanning direction along with the carriage 2. In the following description, a right side of FIG. 1 in the scanning direction is referred to as "one side", and a left side of FIG. 1 is referred to as "the other side". Moreover, a direction (directed downward from an upper side in FIG. 1) orthogonal to the scanning direction in FIG. 1 is referred to as a conveying direction, and a direction perpendicular to a paper surface is referred to as an up-down direction.

Inks of four colors, black, yellow, cyan, and magenta are supplied to the ink-jet head 1 from the ink tank 6 via tubes not depicted in the diagram. A lower surface of the ink-jet head 1 is a nozzle surface 11*y* (refer to FIG. 3), and a plurality of nozzles 21 is formed in the nozzle surface 11*y*. The ink-jet head 1 discharges the ink from the plurality of nozzles 21.

The plurality of nozzles 21 forms four nozzle rows 21*a* arranged side-by-side in the scanning direction. Each nozzle row 21*a* includes the plurality of nozzles 21 lined up along the conveying direction. The inks of black, yellow, cyan, and magenta are discharged in order from the nozzle row 21 located on the extreme right of the scanning direction in FIG. 1. A configuration of the ink-jet head 1 will be described later in detail.

Figure 3:
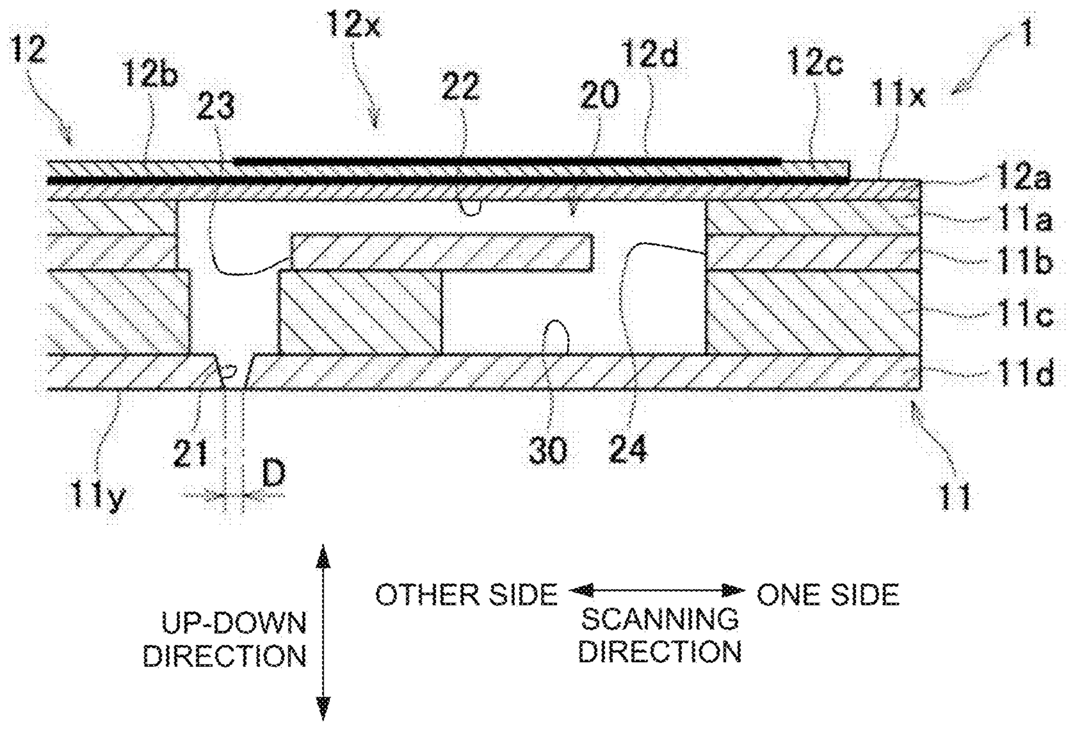
FIG. 3 is a cross-sectional view of the ink-jet head along a line III-III in FIG. 2.

The platen 4 is arranged face-to-face to the nozzle surface 11*y* of the ink-jet head 1 (refer to FIG. 3). The platen 4 is extended in the scanning direction over an entire length of a recording paper P. The platen 4 supports the recording paper P from below. The transporting rollers 5*a* and 5*b* are arranged at an upstream side and a downstream side respectively of the carriage 2 in the conveying direction, and transport the recording paper P in the conveying direction.

The controller 7 includes a ROM (Read Only Memory), a RAM (Random Access Memory), and an ASIC (Application Specific Integrated Circuit) which includes various control circuits. The ASIC of the controller 7 executes various processing related to an operation of the printer 100. For instance, in a print processing, an ink discharge operation and a transportation operation are carried out alternately. The ink discharge operation is an operation of making discharge an ink while moving the ink-jet head 1 together with the carriage 2 in the scanning direction. The transportation operation is an operation of transporting the recording paper P by a predetermined amount in the conveying direction by the transporting rollers 5*a* and 5*b*.

<Ink-Jet Head 1>

Figure 2:
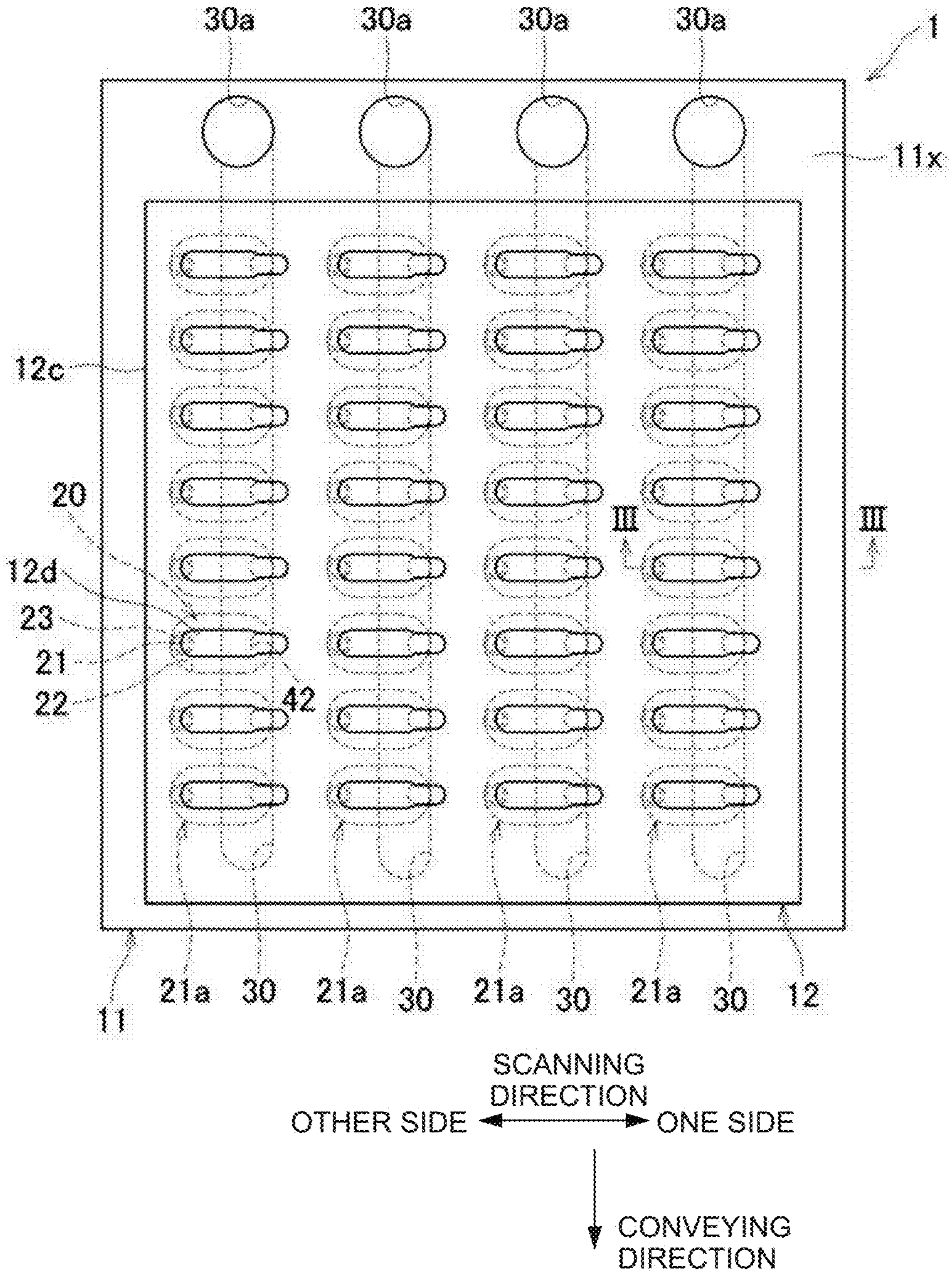
FIG. 2 is a plan view of the ink-jet head depicted in FIG. 1.

Next, a configuration in detail of the ink-jet head 1 will be described below while further referring to FIG. 2 and FIG. 3. As depicted in FIG. 2, the ink-jet head 1 has an outer shape which is a rectangular shape longer in the conveying direction in a top view. The ink-jet head 1 includes a channel member 11 and a piezoelectric actuator 12.

The channel member 11, as depicted in FIG. 3, is formed by four plates 11*a*, 11*b*, 11*c*, and 11*d* (hereinafter, "plates 11*a* to 11*d*") stacked in the up-down direction and stuck to one another. A plurality of individual channels 20 and manifolds 30 are formed in the channel member 11. Through holes which constitute the individual channels 20 and the manifolds 30 are made in the plates 11*a* to 11*d*.

As depicted in FIG. 2, four manifolds 30, each extended along the conveying direction, are formed to be isolated from one another in the scanning direction in the channel member 11. The four manifolds 30 correspond to the black, yellow, cyan, and magenta inks respectively. Each manifold 30 communicates with the ink tank 6 via a supply port 30*a* provided at an end portion of the upstream side of the conveying direction. The supply port 30*a* opens on an upper surface 11*x* of the channel member 11. As depicted in FIG. 3, the manifold 30 is constituted by a through hole formed in the plate 11*c*.

As depicted in FIG. 3, each individual channel 20 has the nozzle 21. Each manifold 30 is provided in common to the plurality of individual channels 20. The ink in the ink tank 6 is supplied to the manifold 30 through the supply port 30*a* by a pump which is not depicted in the diagram. The ink supplied to the manifold 30, while flowing from the upstream side toward the downstream side in the conveying direction through the manifold 30, is supplied to each individual channel 20 and is discharged from the nozzles 21.

Each individual channel 20, as depicted in FIG. 3, includes the nozzle 21, a pressure chamber 22, a connecting channel 23, and a communicating hole 24. As depicted in FIG. 2, the nozzle row 21*a* constituted by the plurality of nozzles 21 communicating with each manifold 30 is positioned on the other side of the scanning direction with respect to corresponding manifold 30.

As depicted in FIG. 3, each nozzle 21 is constituted by a through hole made in the plate 11*d*, and opens on the nozzle surface 11*y* which is the lower surface of the channel member 11. The communicating hole 24 is connected to one end portion on one side in the scanning direction of the pressure chamber 21. The connecting channel 23 is connected to the other end portion in the scanning direction of the pressure chamber 22. The pressure chamber 22 communicates with the nozzle 21 and the manifold 30.

The connecting channel 23 connects the nozzle 21 and the pressure chamber 22 to one another. The connecting channel 23 is constituted by a through hole made in each of the plate 11*b* and the plate 11*c*. The communicating hole 24 connects the manifold 30 and the pressure chamber 22 to one another. The communicating hole 24 is constituted by a through hole made in the plate 11*b*.

The ink supplied from the manifold 30 to the individual channel 20 inflows into the pressure chamber 22 through the communicating hole 24, and upon moving substantially horizontally inside the pressure chamber 22, inflows into the connecting channel 23. The ink inflowed into the connecting channel 23 moves downward and is discharged from the nozzle 21.

<Piezoelectric Actuator 12>

As the piezoelectric actuator 12, a thin-film piezoelectric element is adopted. As depicted in FIG. 3, the piezoelectric actuator 12 includes a plurality of piezoelectric elements 12*x* arranged on an upper surface of the vibration plate 12*a* corresponding to the plurality of pressure chambers 22 respectively.

The plurality of piezoelectric elements 12*x* is constituted by forming a plurality of thin films one by one including a film which becomes a common electrode 12*b*, a film which becomes a piezoelectric layer 12*c*, and a film which becomes an individual electrode 12*d*, on the upper surface of the vibration plate 12*a*.

On the upper surface of the vibration plate 12*a*, the common electrode 12*b* and the piezoelectric layer 12*c* are formed spreading over the plurality of pressure chambers 22. The piezoelectric layer 12*c*, for instance, is formed of a piezoelectric material having lead zirconate titanate (PZT) as a main constituent, which is a mixed crystal of lead titanate and lead zirconate. The piezoelectric layer 12*c* may be formed of a lead-free piezoelectric material which does not contain lead. It is possible to form the piezoelectric layer 12*c* by a film-forming method such as sol-gel method and sputtering method. The plurality of individual electrodes 12*d* corresponding to the plurality of pressure chambers 22 respectively is formed on the upper surface of the piezoelectric layer 12*c*.

In the configuration heretofore, one piezoelectric element 12*x* corresponding to one pressure chamber 22 is constituted by a portion of the common electrode 12*b* facing the corresponding pressure chamber 22, a portion of the piezoelectric layer 12*c* facing the corresponding pressure chamber 22, and one individual electrode 12*d* facing the corresponding pressure chamber 22.

The common electrode 12*b* and the plurality of individual electrodes 12*d* are connected to a driver IC which is not depicted in the diagram via a wiring member not depicted in the diagram. The driver IC maintains an electric potential of the common electrode 12*b* to a ground potential. Moreover, the driver IC supplies the driving signal to the individual electrode 12*d*. Accordingly, an electric potential of the individual electrode 12*d* varies between a predetermined potential and the ground potential. Note that, the driving signal to be supplied to the individual electrode 12*d* is generated in the ASIC of the controller 7 and is transmitted to the driver IC. As it will be mentioned later in detail, in the present embodiment, the driving signal is a rectangular wave of a pulling ejection. Accordingly, a portion of the vibration plate 12*a* and the piezoelectric element 12*x* sandwiched between the common electrode 12*b* and the individual electrode 12*d* is deformed to be convex (to be projected) toward the pressure chamber 22.

Here, a drive procedure which is a so-called pulling ejection of the piezoelectric element 12*x* in the present embodiment will be described below. Firstly, an electric potential of the individual electrode 12*d* is to be set to a driving potential in advance. Then, whenever there is a discharge request, an electric potential of the individual electrode 12*d* is set to the ground potential same as that of the common electrode 12*b*, and thereafter, the electric potential of the individual electrode 12*d* is again set to the driving potential at a predetermined timing. Accordingly, at a timing at which the electric potential of the individual electrode 12 becomes the ground potential, the piezoelectric layer 12*c* returns to an original shape, and a volume of the pressure chamber 22 increases as compared to that at an initial state (a state in which the electric potential of the individual electrode 12*d* and the electric potential of the common electrode 12*b* differs). At this time, an inside of the pressure chamber 22 is negatively pressurized, and the ink is sucked into the pressure chamber 22 from the manifold 30. Thereafter, at a timing at which the electric potential of the individual electrode 12*d* is again set to the driving potential, the piezoelectric layer 12*c* is deformed to be convex (projected) toward the pressure chamber 22. At this time, the volume of the pressure chamber 22 decreases and the inside of the pressure chamber 22 is positively pressurized, thereby leading to a rise in pressure on the ink, and ink droplets are discharged from the nozzle 21. In other words, for making the ink droplets discharge, a driving signal which includes a pulse that sets the driving potential to a basis (standard) is supplied to the individual electrode 12*d*.

Figure 4A:
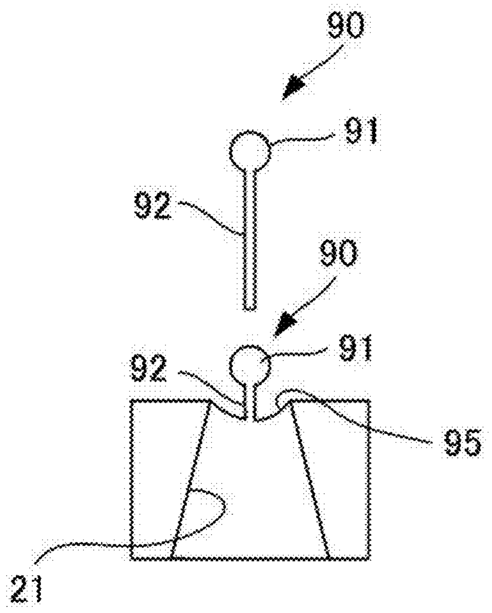
FIG. 4A indicates a state of ink droplets in a case in which a subsequent ink droplet is discharged after a tail of an ink droplet discharged previously is cut (run out), and FIG. 4B indicates a state of ink droplets in a case in which the subsequent ink droplet is discharged before the tail of the previous ink droplet is cut (run out).

As depicted in FIG. 4A, by applying a pulse to the individual electrode 12*d*, an ink droplet 90 discharged from the nozzle 21 consists of a main liquid droplet 91 having a spherical shape and a tail 91 having a thin pillar shape extended from a rear end of the main liquid droplet 91. A rear end of the tail 92, after elapsing of a certain time after the pulse is applied to the individual electrode 12*d*, separates from a meniscus 95 formed at a discharge port of the nozzle 21. In the description hereafter, a time from a timing at which the pulse is applied to the individual electrode 12*d* (more elaborately, from a timing at which the electric potential of the driving signal is changed from the driving potential to the ground potential) till the rear end of the tail 91 separates from the meniscus 95 is called as a pinch-off time.

Figure 4B:
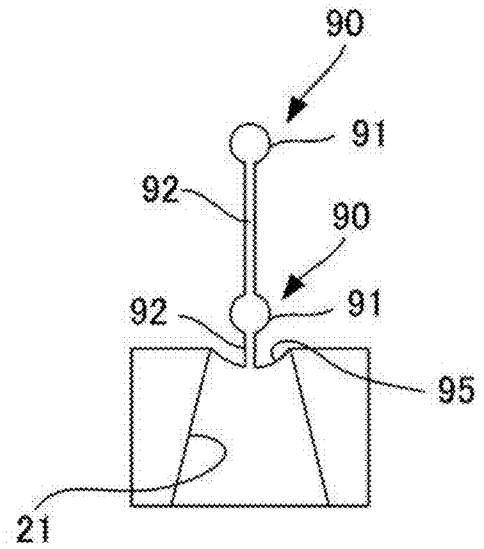

Here, as depicted in FIG. 4B, a case in which, a timing of discharging the subsequent (second) ink droplet 90 has come before the pinch-off time of the (first) ink droplet 90 discharged before has elapsed, will be taken into consideration. In this case, the main liquid droplet 91 of the second ink droplet 90 is attached to the tail 92 of the first ink droplet 90. Accordingly, there may be a change in a size of the ink droplet 90, a change in a distance (an interval) between a landing position of the first ink droplet 90 and a landing position of the second ink droplet 90 on the recording paper P, and a shift in the landing position of the ink droplet 90 on the recording paper P.

Figure 5:
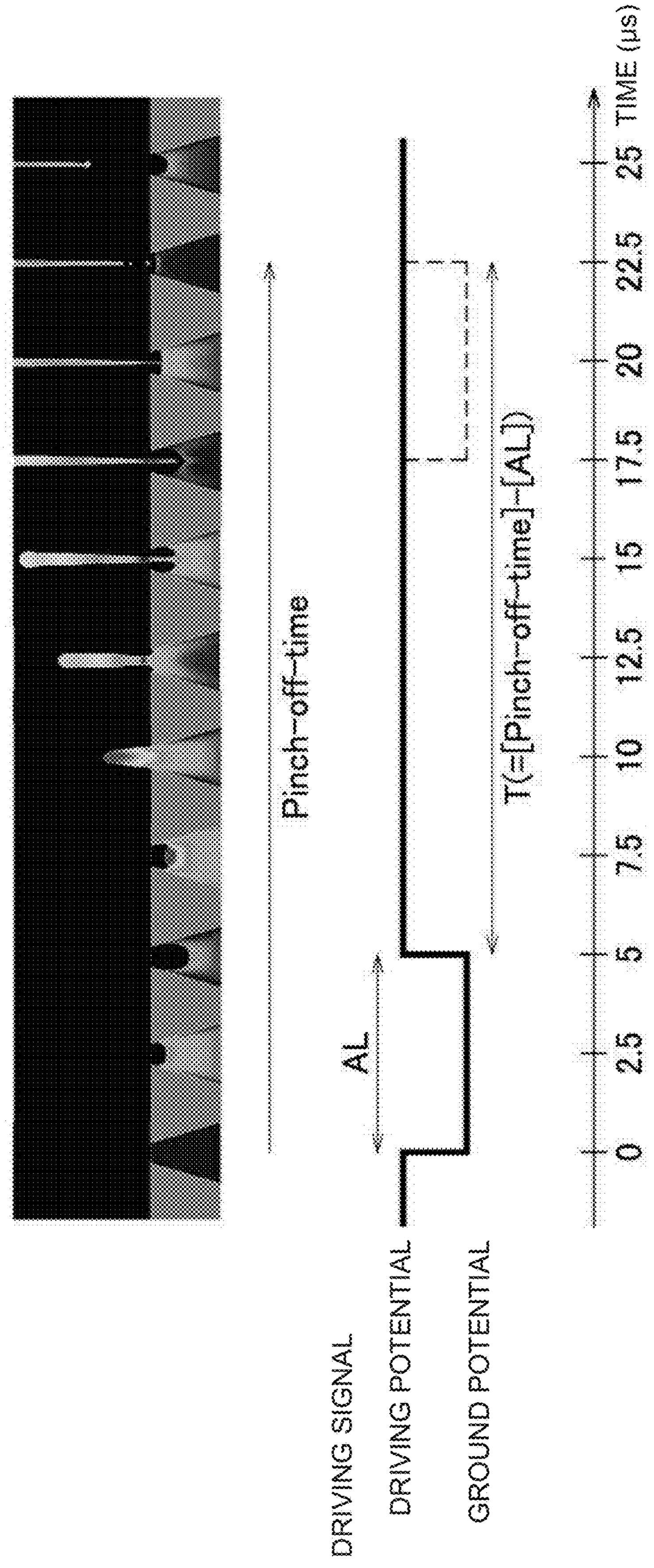
FIG. 5 is a diagram depicting a waveform of a driving signal applied to a piezoelectric actuator and a state of an ink droplets discharged from the nozzle.

In FIG. 5, a driving signal which is applied to the individual electrode 12*d* of the piezoelectric actuator 12 and how the ink droplet 90 is discharged from the nozzle 21 by the driving signal applied is depicted. According to FIG. 5, a time at which the driving signal changes from the driving potential to the ground potential is let to be 0 μs. A pules width AL is 5 μs, and at a time 5 μs, the driving signal changes from the ground potential to the driving potential. Accordingly, the volume of the pressure chamber 22 decreases and the inside of the pressure chamber 22 is positively pressurized, thereby leading to a rise in pressure on the ink. Moreover, at a time 22.5 μs, the rear end of the tail 92 of the ink droplet 90 discharged from the nozzle 21 separates from the meniscus 95. In other words, the pinch-off time is 22.5 μs.

For the main liquid droplet 91 of the second ink droplet 90 discharged subsequently not to be attached to the tail 92 of the first ink droplet 90, it is necessary to set the timing of raising the pressure on the ink by positively pressurizing the inside of the pressure chamber 22 for discharging the second ink droplet 90 to be later than the pinch-off time of the first ink droplet 90. Therefore, the pulse for discharging the second ink droplet 90 at the earliest is a pulse which changes the electric potential from the ground potential to the driving potential at the pinch-off time (22.5 μs) of the first ink droplet 90 as depicted by broken lines in FIG. 5. At this time, an interval (period, cycle) T between the pulse for discharging the first ink droplet 90 and the pulse for discharging the second ink droplet 90 is [pinch-off time]−[AL]. In other words, the limit driving frequency which is the maximum driving frequency taking into consideration the pinch-off time is 1/([pinch-off-time]−[AL]).

Figure 6:
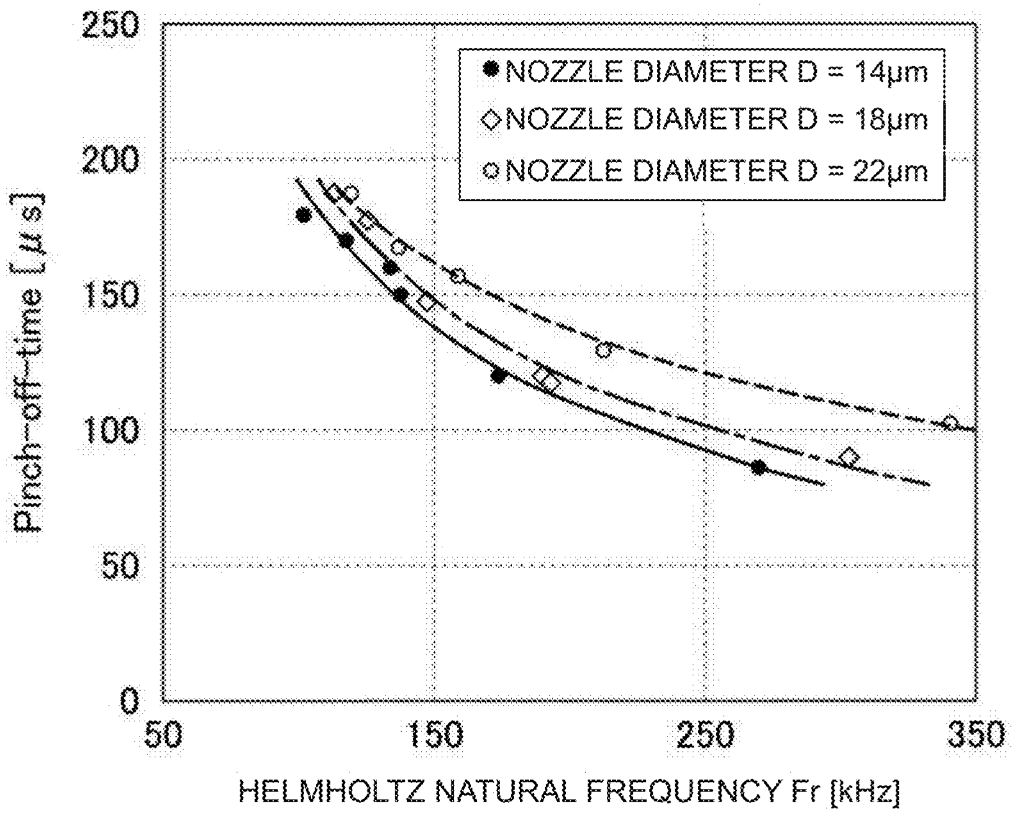
FIG. 6 is a graph depicting a calculation (computation) result of a pinch-off time with respect to a diameter of the nozzle and a Helmholtz natural frequency.

The inventors of the present application, by numerical calculation, discovered that the pinch-off-time depends on the diameter D of the nozzle 21 (refer to FIG. 3) and the Helmholtz natural frequency Fr. The Helmholtz frequency Fr is determined by a stiffness of the piezoelectric element 12*x* of the piezoelectric actuator 12 and a shape and a size of the pressure chamber 22. Here, a result of calculation of the pinch-off-time for three head models with the diameter D of the nozzle 14 μm, 18 μm, and 22 μm when the Helmholtz frequency Fr is changed is depicted in FIG. 6. As depicted in FIG. 6, the smaller the diameter D of the nozzle, the shorter is the pinch-off-time, and the higher the Helmholtz natural frequency Fr, the shorter is the pinch-off-time.

Moreover, from the result, a relationship of the limit driving frequency taking into consideration the pinch-off-time, the volume of the ink droplet, and diameter D of the nozzle, and the Helmholtz natural frequency Fr was achieved. The calculation was carried out on the basis of the following premise.

- physical properties of ink: viscosity approximately 4 mPa·s, surface tension approximately 34 mN/m
- diameter D of nozzle: 14 μm~22 μm
- Helmholtz natural frequency Fr: 101.6 kHz~340.5 kHz (calculated upon varying actuator compliance)
- driving signal of piezoelectric actuator: pulling-ejection rectangular waveform (refer to FIG. 5)
- pulse width AL of the driving signal: 1/(2*Fr) (Fr is Helmholtz natural frequency)
- pinch-off-time: time from a timing at which the pulse was applied till the rear end of the tail of the ink droplet separates from the meniscus (refer to FIG. 5)
- limit driving frequency: 1/([pinch-off-time]−[AL])
- pinch-off-time for each model: refer to FIG. 6.

Figure 8:
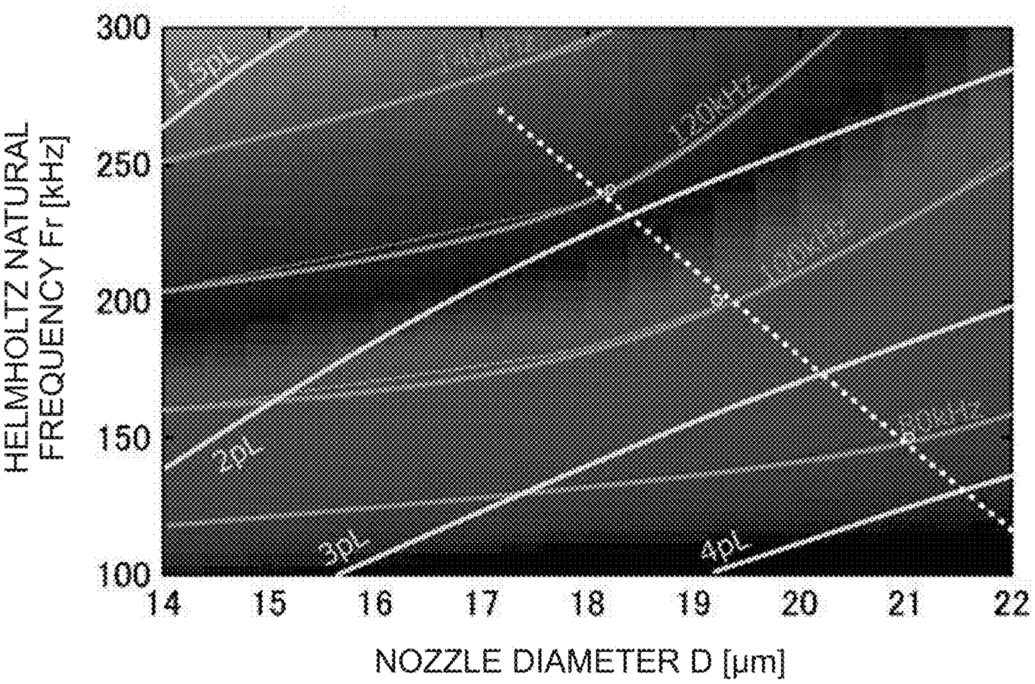
FIG. 8 is a graph indicating a relationship of the limit driving frequency and the volume of the ink droplet with respect to the diameter of the nozzle and the Helmholtz natural frequency, based on the calculation result of FIG. 7.

The result of calculation is depicted in FIG. 7. As depicted in FIG. 7, calculation from No. 1 to No. 15 was made. The calculation has been made by changing a driving voltage of the piezoelectric actuator of each No (number). An approximation to the driving voltage at which the discharge initial speed (velocity) of the ink droplet becomes 10 m/s has been carried out. Moreover, based on the result of FIG. 7, a result of calculation of the limit driving frequency (kHz) and the volume of the ink droplet (pl) for the diameter D of the nozzle and the Helmholtz natural frequency Fr is graphically represented in FIG. 8. In FIG. 8, horizontal axis is the diameter D of the nozzle and a vertical axis is the Helmholtz frequency Fr, the limit driving frequency is indicated by grey contour lines, and the volume of the ink droplet is indicated by white contour lines.

From a graph of FIG. 8, it is evident that for achieving the maximum liquid droplet amount at a certain driving frequency, a relationship of Helmholtz natural frequency Fr and the diameter D of the nozzle has to be the most appropriate. From the graph, approximately, at the driving frequency 120 kHz, discharge of an ink droplet of the liquid droplet amount of approximately 2 pl is possible with the Helmholtz natural frequency 240 kHz, and the nozzle diameter 18.2 μm. At the driving frequency 100 kHz, discharge of an ink droplet of the liquid droplet amount of approximately 2.5 pl is possible with the Helmholtz natural frequency 200 kHz, and the nozzle dimeter 19.2 μm. At the driving frequency 80 kHz, discharge of an ink droplet of the liquid droplet amount of approximately 3.5 pl is possible with the Helmholtz natural frequency 150 kHz, and the nozzle diameter 21 μm. In other words, a line which satisfies D=−0.0368×Fr+27 indicated by a broken line in FIG. 8 becomes a line which achieves the maximum liquid amount with respect to the driving frequency. However, it is to be assumed that the Helmholtz natural frequency Fr is not smaller than 100 kHz and the driving frequency is not lower than 80 kHz. Practically, when the nozzle diameter D is made large maintaining the Helmholtz natural frequency Fr, a decline in the limit driving frequency becomes large. Moreover, when the nozzle diameter D is large, there is an adverse effect such as degradation of a resistance property of meniscus. Consequently, it is preferable to let the range to be D<−0.0313×Fr+25.62.

Moreover, from the result of the numerical calculation, it is preferable that the Helmholtz natural frequency Fr is in a range of 110 kHz to 340 kHz. Furthermore, it is preferable that the volume of the ink droplet is in a range of 1.0 pl to 4.5 pl.

FEATURES OF EMBODIMENT

As described heretofore, the ink-jet head 1 of the abovementioned embodiment includes the channel member 11 and the piezoelectric actuator 12. The channel member 11 has the plurality of individual channels 20, and each individual channel 20 has the pressure chamber communicating with the nozzle 21. The piezoelectric actuator 12 causes the change of pressure on the ink in the pressure chamber 22 of each individual channel 20, and makes the ink discharge from the nozzle 21. The piezoelectric actuator 12 has the piezoelectric element 12*x* which is a thin-film piezoelectric element. The ink-jet head 1, when the Helmholtz natural frequency of the pressure chamber 22 is let to be Fr (kHz) and the diameter of the nozzle is let to be D (μm), satisfies the relationship D<−0.0313×Fr+25.62 (provided that 100 kHz≤Fr). Moreover, the viscosity of the ink discharged is not higher than 5 mPa·s.

The inventors of the present application discovered that the pinch-off-time which is the time in which the rear end of the tail 92 of the ink droplet 90 discharged from the nozzle 21 separates from the meniscus 95 depends on the nozzle diameter D and the Helmholtz natural frequency Fr. Moreover, the inventors of the present application, by the numerical calculation, achieved the relationship of the limit driving frequency taking into consideration the pinch-off-time, the volume of the ink droplet, the nozzle diameter D, and the Helmholtz natural frequency Fr (refer to FIG. 8). From this result, when the Helmholtz natural frequency Fr (kHz) and the nozzle diameter D (μm) satisfy the relationship D<−0.0313×Fr+25.62 (provided that 100 kHz≤Fr), it is possible to increase the driving frequency and to discharge the ink droplet 90 stably without having an effect of the tail 92 of the ink droplet 90 discharged previously, while securing adequately the volume of the ink droplet 90 discharged from the nozzle 21.

Moreover, in the ink-jet head 1 of the abovementioned embodiment, the ink discharged from the nozzle 21 has the viscosity of approximately 4 mPa·s and the surface tension 34 mN/m. This is a value which is normal for an aqueous ink. Accordingly, stable discharge is all the more possible while increasing the driving frequency.

Furthermore, in the ink-jet head of the abovementioned embodiment, the nozzle diameter D is in the range of 14 μm to 22 μm. Accordingly, the stable discharge is all the more possible while increasing the driving frequency.

Additionally, in the ink-jet head 1 of the abovementioned embodiment, it is preferable that the Helmholtz natural frequency Fr of each individual channel 20 is in a range of 110 kHz to 340 kHz. Accordingly, the stable discharge is all the more possible while increasing the driving frequency.

Furthermore, in the ink-jet head 1 of the abovementioned embodiment, it is preferable that the volume of the ink droplet discharged from the nozzle is in a range of 1.0 pl to 4.5 pl. Accordingly, the stable discharge is all the more possible while increasing the driving frequency.

Moreover, although the embodiment of the present disclosure has been described above by referring to the accompanying diagrams, specific configuration should not be construed as being limited by the embodiment described above. The scope of the present disclosure is indicated not by the abovementioned description of the embodiments but by a scope (by terms) of the patent claims, and further includes all modifications within the scope and meaning equivalent to the scope (the terms) of the claims.

In the abovementioned embodiment, although a case in which the ink discharged from the nozzle 21 has the viscosity of approximately 4 mPa·s and the surface tension of approximately 34 mN/m that are normal values for an aqueous ink has been described, it is not restricted to this case. The viscosity of the ink is to be not higher than 5 mPa·s. For improving the driving frequency and the discharge stability of ink droplets, it is preferable that the viscosity of the ink is in a range of 3 mP·s to 5 mP·s, and the surface tension of the ink is in a range of 30 mN/m to 35 mN/m.

Moreover, in the abovementioned embodiment, although a case in which the nozzle diameter D is in the range of 14 μm to 22 μm has been described, a size of the nozzle diameter D is not restricted to this range.

Furthermore, in the abovementioned embodiment, although a case in which the Helmholtz natural frequency Fr of the individual channel 20 is in the range of 110 kHz to 340 kHz has been described, the Helmholtz natural frequency is not restricted to this range. The Helmholtz natural frequency is to be not lower than 100 kHz.

Moreover, in the abovementioned embodiment, although a case in which the volume of the ink droplet discharged from the nozzle is in the range of 1.0 pl to 4.5 pl has been described, the volume of the ink droplet is not restricted to this range.

In addition, in the abovementioned embodiment, although a case in which the driving signal applied to the piezoelectric actuator 12 has a pulling-ejection waveform has been described, the driving signal applied to the piezoelectric actuator 12 may have a pushing-ejection waveform.

Furthermore, in the abovementioned embodiment, although a case in which the pulse width AL of the driving signal applied to the piezoelectric actuator 12 is 1/(2*Fr) (Fr denotes the Helmholtz natural frequency) has been described, the pulse width AL is not restricted to the abovementioned pulse width. In other words, for instance, the pulse width AL of the driving signal may be of a size (magnitude) at which the speed (velocity) of the ink droplet discharged from the nozzle 21 becomes the maximum.

The recording mode of the printer 100 is not restricted to the serial mode, and may be a line mode in which the printer is long in a direction of width of the recording paper P. and the ink is discharged from nozzles of a head having a fixed position.

The liquid to be discharged from the nozzle 21 is not restricted to ink, and may be an arbitrary liquid (such as a process liquid which causes agglomeration or precipitation of a component in an ink). Moreover, a target of discharge is not restricted to the recording paper, and may be a cloth, a substrate etc.

The present disclosure is not restricted to a printer, and is also applicable to a facsimile, a copy machine, and a multi-function device. Moreover, the present disclosure is also applicable to a liquid discharge apparatus which is used for an application other than recording an image (such as a liquid discharge apparatus which forms an electroconductive pattern by discharging an electroconductive liquid on to a substrate).

What is claimed is:

1. A printer comprising:

a tank storing liquid;

a liquid discharging head including:

a channel member having a plurality of individual channels, each of the individual channels having a nozzle and a pressure chamber communicating with the nozzle; and a piezoelectric actuator configured to create a pressure change in the liquid supplied from the tank to the pressure chamber and to cause the liquid to be discharged from the nozzle; and a driving-signal generator configured to generate a driving signal for driving the piezoelectric actuator, wherein the piezoelectric actuator has a thin-film piezoelectric element, under a condition that a Helmholtz natural frequency Fr (kHz) of each of the individual channels is in a range of 110 kHz to 340 kHz and a diameter of the nozzle is D (μm), a relationship $$D<-0.0313\times Fr+25.62 \text{ is satisfied,}$$

a viscosity of the liquid discharged from the nozzle is not higher than 5 mPa·s, and under a condition that a pulse width of the driving signal generated by the driving-signal generator is AL (s), a relationship $$AL=1/(2*Fr) \text{ is satisfied.}$$

2. The printer according to claim 1, wherein the liquid discharged from the nozzle is an aqueous ink having a viscosity in a range of 3 mPa·s to 5 mPa·s and having a surface tension in a range of 30 mN/m to 35 mN/m.

3. The printer according to claim 1, wherein the diameter of the nozzle is in a range of 14 μm to 22 μm.

4. The printer according to claim 1, wherein by driving the piezoelectric actuator based on the driving signal generated by the driving-signal generator, a volume of the pressure chamber is reduced to be not more than a predetermined volume after the volume of the pressure chamber has been increased from the predetermined volume.

5. The printer according to claim 4, wherein a pulse width of the driving signal generated by the driving-signal generator is a size at which velocity of a liquid droplet discharged from the nozzle becomes maximum.

6. The printer according to claim 1, wherein a volume of a liquid droplet discharged from the nozzle is in a range of 1.0 pl to 4.5 pl.

* * * * *